3,409,162
HOUSING FOR SMALL APPLIANCES, PARTICULARLY FOR LIGHTERS

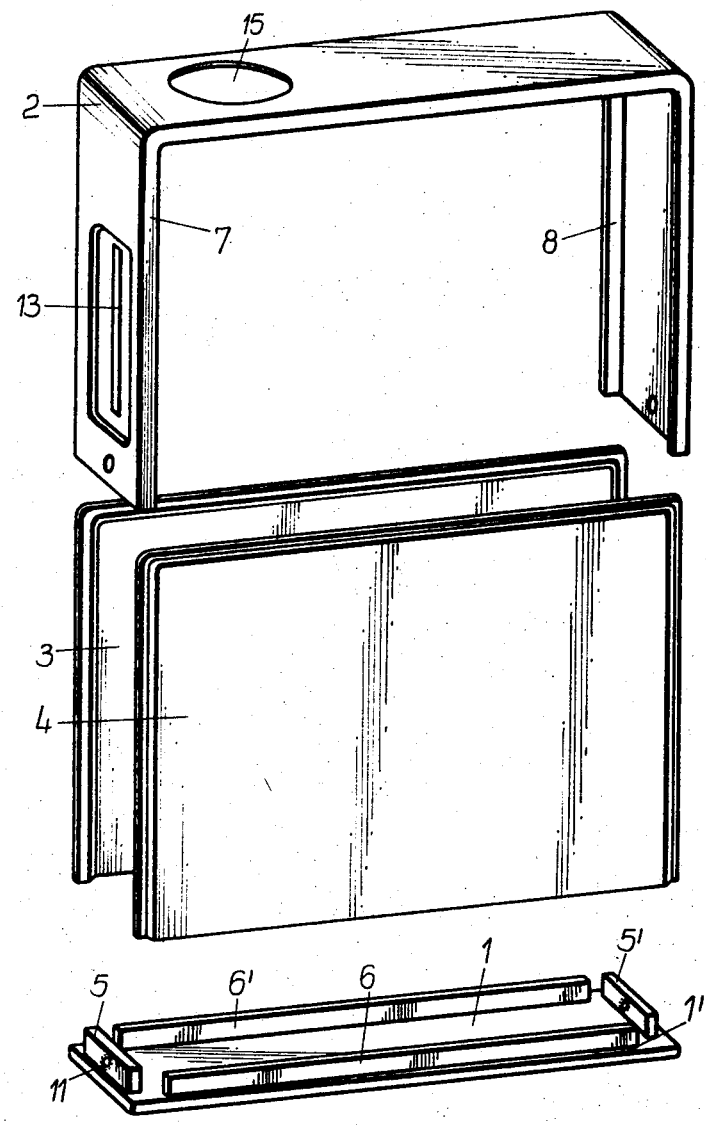

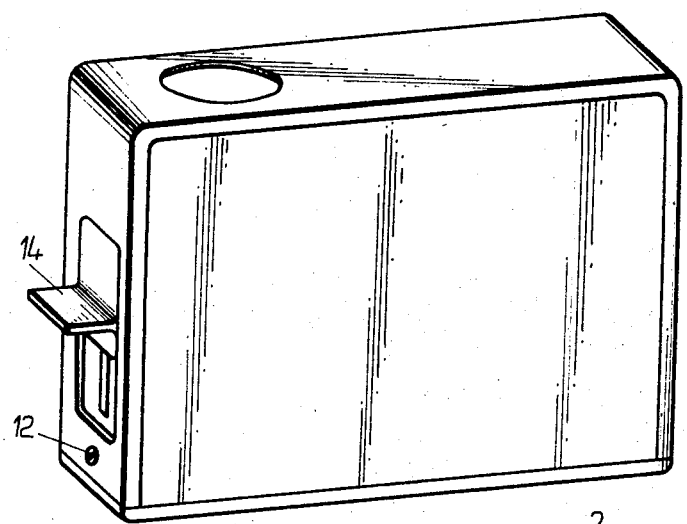
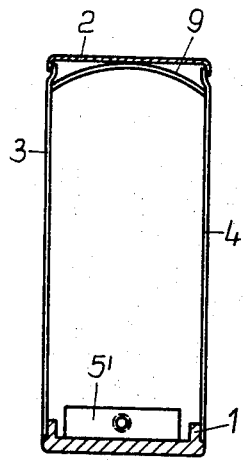
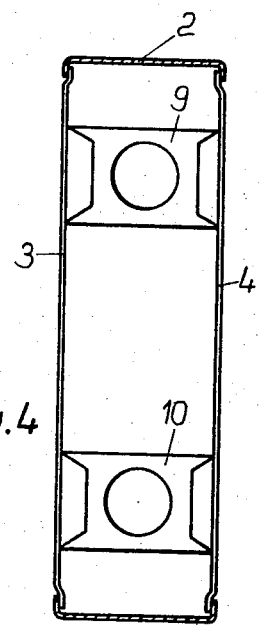

Gotthard Mahlich, Hofheim, Taunus, Reinhold Weiss, Frankfurt am Main, and Hans Schindler, Egelsbach, Offenbach, Germany, assignors to Braun Aktiengesellschaft Filed Aug. 18, 1966, Ser. No. 573,261
Claims priority, application Germany, Aug. 25, 1965, B 63,107
4 Claims. (Cl. 220—4)

ABSTRACT OF THE DISCLOSURE

A housing for appliances such as lighters for smokers, comprising as separate component parts: a bottom plate; a pair of two opposite side walls; a bracket-shaped U-frame with legs forming integrally two opposite end walls and the bar connecting the legs forming a cap-shaped cover end means to permit snap-joining of said parts and positively pressure locking them into a unitary housing body; said means including longitudinal edges angled inwardly from the periphery of said side walls and corresponding edges of said frame to mate with each other on compression assembly from the inside of said housing into locking prestressed engagement.

Field of the invention

The housing of this invention for appliances such as lighters comprises a bottom plate and a cap-shaped cover mounted thereon. The cover comprises a U-bracket-shaped frame forming the cover portion and end walls of the housing, and two exchangeable housing side walls. The longitudinal edges of the frame are angled inwardly, and the side walls engage the longitudinal edges of the frame from the inside, being fixedly connected therewith, preferably by means of leaf springs.

The prior art

It is known to construct such housings with a bottom plate and a cap-shaped housing top which can be placed onto or pushed over the bottom plate.

Such a housing can be easily and rapidly constructed, but permits only a predetermined housing construction which can be varied by attaching a different cap portion is possible; this makes it necessary to keep large quantities of caps in storage.

Summary of the invention

The object of this invention is to provide a housing for appliances which can be manufactured at low expense and whose construction permits versatile modifications of the housing with respect to shape and color of its components.

These requirements are met in a housing for appliances, particularly for lighters, having a bottom plate and a cap-shaped cover portion. According to the invention, the cap-shaped cover portion includes a bracket-shaped frame forming the narrow ends and the cover of the housing and having inwardly angled longitudinal edges and two separate exchangeable side walls for the housing; the side walls engage the longitudinal edges of the frame from the inside and are positively connected therewith.

In order to provide such a positive connection of the side walls of the housing with the longitudinal edges of the frame, leaf springs inserted under a pretension are provided in the inside of the frame. The front sides of these leaf springs press against the side walls. The ends of the leaf springs are preferably in the shape of claws or spikes which penetrate into the inner surfaces of the side walls and thus are attached in a shakeproof manner without additional holding means. The housing frame, completed by assembly with the respectively desired side walls, is snapped onto the bottom plate of the housing in the manner of a cap, or pushed over the bottom of the housing.

By means of the novel construction of the housing, it is possible to achieve a change in design of the housing solely by substituting designs; side walls having different use of the basic elements of the housing, namely, the bottom and the bracket-shaped housing frame, is retained. The flat side walls are simple to manufacture and to finish and take up little space in the store room. Therefore, it is easy to manufacture and store a wide variety of side walls having varying designs.

Description of the drawings

The invention is explained in greater detail in the following with reference to the drawings which illustrate one embodiment of the lighter housing of this invention.

FIG. 1 is an exploded perspective view of the basic components of the housing assembly, in their relative spatial positions;

FIG. 2 is a perspective view of the assembled housing of FIG. 1;

FIG. 3 is a vertical cross-sectional view of the housing looking toward one end thereof, and FIG. 4 is a horizontal cross-sectional bottom view of the housing frame with the side walls attached.

Description of the preferred embodiments

As can be seen from the drawings, the housing consists of a bottom plate 1 onto which the housing frame 2 with the side walls 3 and 4 inserted therein is placed. The bottom plate 1 is in this case offset toward the inside by respectively two pairs of mutually parallel ridges 5, 5' and 6, 6'. The outer edges of the rims 5, 5' and 6, 6' correspond in shape and size to the inside dimensions of the frames and side walls 3, 4.

The surface of the step formed by this offset arrangement, i.e., the marginal zone 1' of the bottom plate 1 remaining outside of the ridges, forms the support for the frame 2 and the side walls 3 and 4.

The frame 2 is provided with longitudinal edges 7 and 8 angled toward the inside; the side walls 3 and 4 are pressed against these edges with their rims by two leaf springs 9 and 10 insertable in the upper portion of the frame under pretension. The ends of the leaf springs are sharp points having the shape of spikes and penetrate the inner surfaces of the two side walls, whereby the leaf springs are fixedly mounted in a shock-proof manner, without additional attaching means. The rims of the side walls 3 and 4 are advantageously offset toward the inside by the thickness of the longitudinal edges 7 and 8 by which they are encompassed, so that the outer surfaces of the side walls and of the longitudinal frame edges are flush with one another.

After attaching the side walls to the housing frame in the above-described manner, the housing top 2, 3, 4, is placed upon the bottom plate 1. As mentioned above, the lower rims of the cap-shaped top portion come to rest on the marginal region of the bottom plate 1. The ridges 5, 5' and 6. 6', whose mutual distance corresponds to the inside diameter of the top portion of the housing, prevent the attached top portion from lateral displacement. The top portion is then fastened by two screws 12 received by threaded bores 11 of the ridges 5, 5'.

The slot 13 in the housing frame 2 is an opening for the operating tab or projection 14 of the device and the opening 15 is the exit for the flame.

Obviously, many modifications and variations of the invention as hereinabove set forth can be made without departing from the essence and scope thereof, and only such limitations should be applied as are indicated in the claims.

We claim:
1. A housing for appliances such as lighters comprising a bottom plate and a cap-shaped cover mounted thereon, the cover comprising a bracket-shaped frame forming the cover and end walls of the housing, and two separate housing side walls, and means to permit snap-joining of the parts and posetively pressure locking them on compression into assembly, the longitudinal edges of the frame being angled inwardly, and the side walls engaging the longitudinal edges of the frame from the inside and being fixedly connected therewith, at least one pretensioned leaf spring inserted in the inside of the frame between the side walls for fixedly connecting the side walls with the longitudinal edges of the frame, the front ends of the leaf spring pressing against the inner surfaces of the side walls.

2. A housing as described in claim 1 wherein the front ends of the leaf spring have sharp projections.

3. A housing as described in claim 1 wherein the bottom plate includes ridge portions inwardly offset from the outer edges thereof to define a step along the outer edges thereof, the step supporting the lower edge of the top and the ridges supporting the top against lateral movement.

4. A housing as described in claim 3 wherein the longitudinal edges of the side walls are inwardly offset by the thickness of the longitudinal frame edges receiving the side walls, whereby the side wall surfaces are flush with the frame surfaces adjacent thereto.

References Cited

UNITED STATES PATENTS 2,100,226  11/1937  Stenberg.
2,457,023  12/1938  Zelt.

THERON E. CONDON, *Primary Examiner.*

GEORGE E. LOWRANCE, *Assistant Examiner.*